(12) United States Patent
Zhou et al.

(10) Patent No.: US 9,825,861 B2
(45) Date of Patent: Nov. 21, 2017

(54) PACKET FORWARDING METHOD, APPARATUS, AND SYSTEM

(71) Applicant: Huawei Technologies Co., Ltd., Shenzhen (CN)

(72) Inventors: Daolong Zhou, Nanjing (CN); Ying Xie, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 14/947,485

(22) Filed: Nov. 20, 2015

(65) Prior Publication Data

US 2016/0156555 A1    Jun. 2, 2016

(30) Foreign Application Priority Data

Nov. 27, 2014  (CN) .......................... 2014 1 0706094

(51) Int. Cl.
*H04L 12/741* (2013.01)
*H04L 29/12* (2006.01)
(Continued)

(52) U.S. Cl.
CPC .......... *H04L 45/745* (2013.01); *H04L 61/103* (2013.01); *H04L 61/2007* (2013.01); *H04L 61/6009* (2013.01); *H04L 61/6022* (2013.01); *H04L 69/22* (2013.01); *H04L 45/24* (2013.01); *H04L 45/742* (2013.01); *H04L 47/125* (2013.01); *H04L 61/6077* (2013.01)

(58) Field of Classification Search
CPC ..... H04L 45/24; H04L 45/742; H04L 45/745; H04L 61/103; H04L 61/2007; H04L 61/6009; H04L 61/6022; H04L 61/6077

USPC .......................................................... 370/392
See application file for complete search history.

(56) References Cited

U.S. PATENT DOCUMENTS

2004/0111640 A1* 6/2004 Baum ................. H04L 61/2015
726/13
2004/0193716 A1* 9/2004 McConnell ....... H04L 29/12009
709/228

(Continued)

OTHER PUBLICATIONS

Carl-Mitchell, S., et al., "Using ARP to Implement Transparent Subnet Gateways," RFC 1027, Oct. 1987, 9 pages.

(Continued)

*Primary Examiner* — Asad Nawaz
*Assistant Examiner* — Saad A Waqas
(74) *Attorney, Agent, or Firm* — Conley Rose, P.C.

(57) ABSTRACT

A packet forwarding method, apparatus, and system in which a host receives a first packet sent by a gateway, and parses the first packet to obtain a source IP address and a source MAC address from the first packet; queries a host cache table, when a mapping relationship between the source IP address and the source MAC address does not exist in the host cache table, saves the mapping relationship between the source IP address and the source MAC address in the host cache table; the host generates a response packet according to the first packet, and queries the host cache table to acquire a first destination MAC address corresponding to a first destination IP address that is in the response packet; and forwards, according to the first destination MAC address, the response packet to an external network by using the gateway.

12 Claims, 3 Drawing Sheets

(51) Int. Cl.
*H04L 29/06* (2006.01)
*H04L 12/707* (2013.01)
*H04L 12/803* (2013.01)
*H04L 12/747* (2013.01)

(56) References Cited

U.S. PATENT DOCUMENTS

| | | | | |
|---|---|---|---|---|
| 2012/0144014 A1* | 6/2012 | Natham | ............... | H04L 45/66 709/224 |
| 2014/0195666 A1* | 7/2014 | Dumitriu | ............ | H04L 12/4625 709/223 |
| 2015/0010002 A1* | 1/2015 | Duda | ............... | H04L 45/74 370/392 |
| 2015/0043586 A1* | 2/2015 | Oonuki | ............... | H04L 69/22 370/392 |
| 2016/0197876 A1* | 7/2016 | Bui | ............... | H04L 61/103 370/392 |

OTHER PUBLICATIONS

Postel, J., "Multi-LAN Address Resolution," RFC 925, Oct. 1984, 16 pages.

Shaw, G., "Ensure Symmetric Routing on a Server with Multiple Default Gateways," Retrieved from the Internet: URL: http://web.archive.org/web/20141116090914/http://www.microhowto.info/howto/ensure_symmetric_routing_on_a_server_with_multiple_default_gateways.html [retrieved on Apr. 25, 2016], Nov. 16, 2014, 5 pages.

Foreign Communication From a Counterpart Application, European Application No. 15195151.4, Extended European Search Report dated May 3, 2016, 9 pages.

* cited by examiner

PACKET FORWARDING METHOD, APPARATUS, AND SYSTEM

CROSS-REFERENCE TO RELATED APPLICATION

This application claims priority to Chinese Patent Application No. 201410706094.4, filed on Nov. 27, 2014, which is hereby incorporated by reference in its entirety.

TECHNICAL FIELD

The present disclosure relates to communications technologies, and in particular, to a packet forwarding method, apparatus, and system.

BACKGROUND

In a data center, a multi-active gateway technology is generally used to resolve a problem of cross-regional traffic roundabout, where the multi-active gateway technology indicates that multiple gateways can simultaneously provide a gateway service for servers in a same network segment.

FIG. 1 is a schematic diagram of a packet forwarding process in the prior art. As shown in FIG. 1, a network architecture on which the packet forwarding process is based mainly includes a router 11, a first gateway 12, a second gateway 13, a first server 14, a second server 15, a third server 16, and a fourth server 17. The first gateway 12 and the second gateway 13 are gateways that belong to a network segment A.A.A.A/X; the first gateway 12 provides the gateway service for the first server 14 and the second server 15; the second gateway 13 provides the gateway service for the third server 16 and the fourth server 17. In addition, the packet forwarding process is mainly as follows: If the first gateway 12 and the second gateway 13 simultaneously advertise routes of A.A.A.A/X to the router 11, equal-cost multi-path routing (ECMP) is formed on the router 11. When an external network accesses the first server 14, a packet of which a destination address is the first server 14 is matched to an equal-cost route of A.A.A.A/X on the router 11, and the router 11 sends the packet to the first server 14 by using the first gateway 12 or the second gateway 13. When the first server 14 receives the packet and responds, because it is the first gateway 12 that provides the gateway service for the first server 14, the first server 14 sends a response packet to the router 11 by using the first gateway 12, thereby implementing the multi-active gateway technology.

However, the router 11 may send the packet to the first server 14 by using the second gateway 13, but the first server 14 returns, by using the first gateway 12, the response packet corresponding to the packet. Therefore, a path through which a packet is sent when the external network accesses the server by using a gateway pass is inconsistent with a path through which a response packet sent by the server to the external network by using a gateway passes, resulting in a problem that a service, whose running relies on consistency between paths through which bidirectional packets pass, cannot work normally.

SUMMARY

The present disclosure provides a packet forwarding method, apparatus, and system to resolve a problem in the prior art that a service, whose running relies on consistency between paths through which bidirectional packets pass, cannot work normally because a path through which a packet passes when an external network accesses a server by using a gateway is inconsistent with a path through which a response packet sent by the server to the external network by using a gateway passes.

According to a first aspect, the present disclosure provides a packet forwarding method, including: receiving a first packet sent by a gateway, and parsing the first packet to obtain a source Internet Protocol (IP) address and a source Media Access Control (MAC) address from the first packet; querying a host cache table, and when a mapping relationship between the source IP address and the source MAC address does not exist in the host cache table, saving the mapping relationship between the source IP address and the source MAC address in the host cache table; generating a response packet according to the first packet, and querying the host cache table to acquire a first destination MAC address corresponding to a first destination IP address that is in the response packet, where the first destination IP address is the same as the source IP address; and forwarding, according to the first destination MAC address corresponding to the first destination IP address that is in the response packet, the response packet to an external network by using the gateway.

According to a second aspect, the present disclosure provides a host, including: a receiver configured to receive a first packet sent by a gateway; a processor configured to: parse the first packet to obtain a source Internet Protocol (IP) address and a source Media Access Control (MAC) address from the first packet; query a host cache table, and when a mapping relationship between the source IP address and the source MAC address does not exist in the host cache table, save the mapping relationship between the source IP address and the source MAC address in the host cache table; and generate a response packet according to the first packet, and query the host cache table to acquire a first destination MAC address corresponding to a first destination IP address that is in the response packet, where the first destination IP address is the same as the source IP address; and a transmitter configured to forward, according to the first destination MAC address corresponding to the first destination IP address that is in the response packet, the response packet to an external network by using the gateway.

According to a third aspect, the present disclosure provides a packet forwarding system, including a client, a router, a gateway, and the host according to the second aspect.

According to the packet forwarding method, apparatus, and system provided in the present disclosure, a first packet sent by a gateway is received, and the first packet is parsed to obtain a source IP address and a source MAC address from the first packet; a host cache table is queried, and when a mapping relationship between the source IP address and the source MAC address does not exist in the host cache table, the mapping relationship between the source IP address and the source MAC address is saved in the host cache table; a response packet is generated according to the first packet, and the host cache table is queried to acquire a first destination MAC address corresponding to a first destination IP address that is in the response packet, where the first destination IP address is the same as the source IP address; and according to the first destination MAC address corresponding to the first destination IP address that is in the response packet, the response packet is forwarded to an external network by using the gateway. Because the mapping relationship between the source IP address and the source MAC address is recorded in the host cache table, the first destination MAC address corresponding to the first destination IP address is obtained by querying the host cache table. Because the first destination MAC address is a real MAC address of the gateway, the response packet can be forwarded to the corresponding gateway according to the first destination MAC address, so that the gateway forwards the response packet to the external network by using the same gateway that forwards the first packet, thereby completing packet exchange and implementing normal communication between a client in the external network and a host. In addition, it is ensured that, in a multi-active gateway scenario, bidirectional packets pass through a same path, so that a service, which can run only when paths of bidirectional packets are consistent, can work normally.

BRIEF DESCRIPTION OF DRAWINGS

To describe the technical solutions in the embodiments of the present disclosure or in the prior art more clearly, the following briefly introduces the accompanying drawings required for describing the embodiments or the prior art. disclosure

DESCRIPTION OF EMBODIMENTS

The following describes the technical solutions in the embodiments of the present disclosure with reference to the accompanying drawings in the embodiments of the present disclosure.

Figure 1:
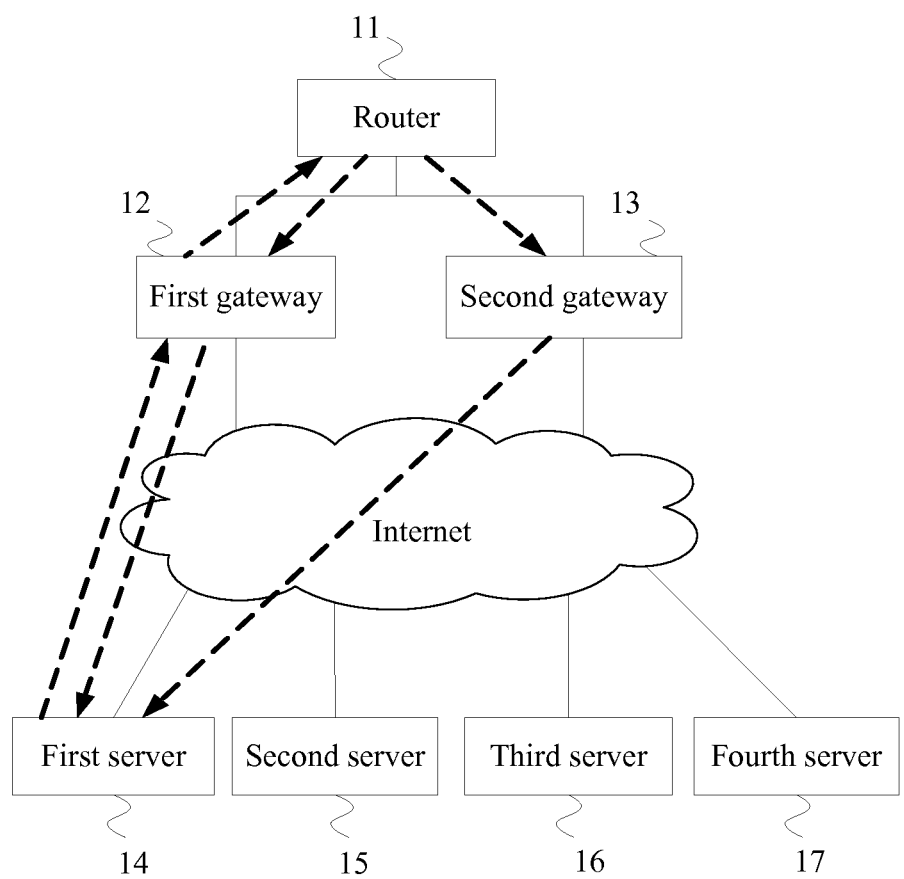
FIG. 1 is a schematic diagram of a packet forwarding process in the prior art.
Figure 2:
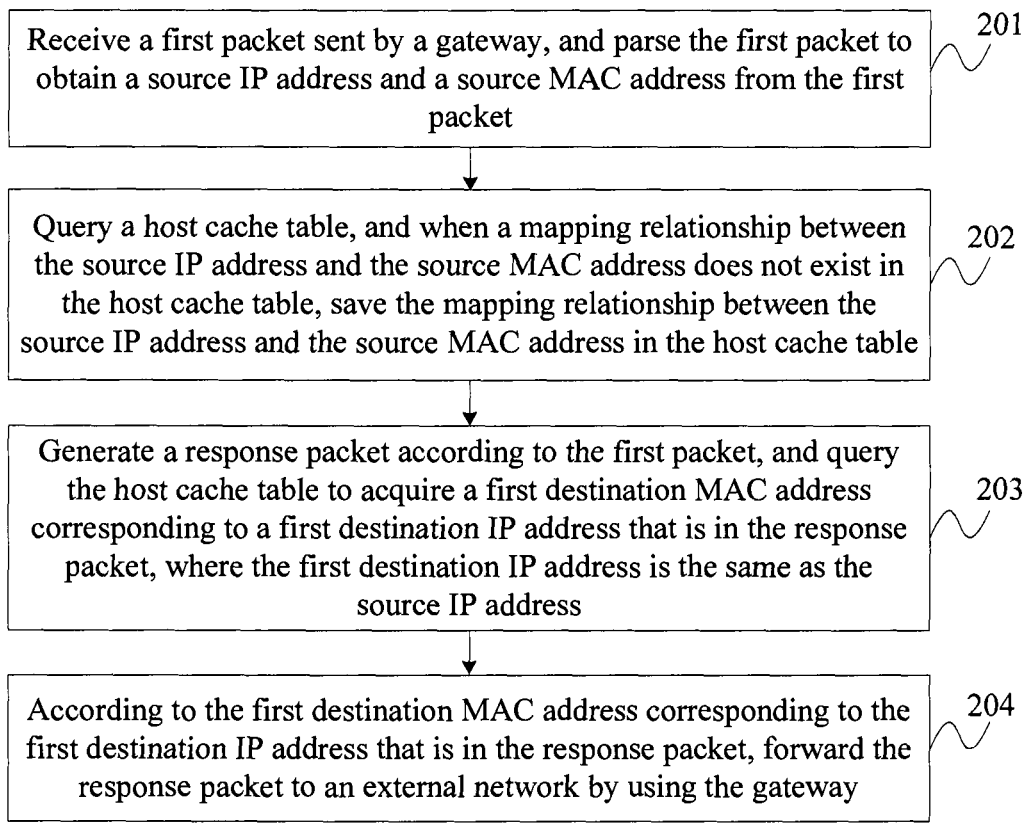
FIG. 2 is a schematic flowchart of an embodiment of a packet forwarding method according to the present disclosure.

FIG. 2 is a schematic flowchart of an embodiment of a packet forwarding method according to the present disclosure. This embodiment of the present disclosure provides a packet forwarding method, and this embodiment is executed by a host. As shown in FIG. 2, the method in this embodiment may include:

Step 201: Receive a first packet sent by a gateway, and parse the first packet to obtain a source IP address and a source MAC address from the first packet.

In this embodiment, when a client in an external network accesses the host, the client sends a packet to the gateway, and then the gateway sends the packet to the host. A source IP address and a source MAC address are encapsulated in a first packet sent by the gateway to the host, where the source IP address is an IP address of the client in the external network, and is used to indicate which client in the external network accesses the host, and the source MAC address encapsulated in the first packet is a real MAC address of the gateway. Because a real MAC address of each gateway is different, MAC addresses may not conflict with each other. In this way, after the host parses the received first packet and obtains the MAC address of the first packet, the host can know which gateway has processed the first packet.

Step 202: Query a host cache table, and when a mapping relationship between the source IP address and the source MAC address does not exist in the host cache table, save the mapping relationship between the source IP address and the source MAC address in the host cache table.

In this embodiment, after receiving the first packet, the host dynamically learns the mapping relationship between the source IP address and the source MAC address from the first packet, and determines, by querying the host cache table, whether the mapping relationship between the source IP address and the source MAC address exists in the host cache table. If the mapping relationship does not exist in the host cache table, the mapping relationship between the source IP address and the source MAC address is saved in the host cache table; if the mapping relationship between the source IP address and the source MAC address already exists in the host cache table, the mapping relationship is not repeatedly saved.

In addition, the host cache table may record which gateway sends the first packet to the host. For example, a first client whose IP address is 1.1.1.1 sends a first packet to the host by using a gateway GW1, where a real MAC address of the gateway GW1 is 1-1-1. After receiving the first packet, the host first queries whether the host cache table has an entry in which a source IP address is 1.1.1.1 and a MAC address is 1-1-1. If the host cache table does not have the entry, this mapping relationship is saved in the host cache table; if the host cache table has the entry, the mapping relationship is not repeatedly saved.

Step 203: Generate a response packet according to the first packet, and query the host cache table to acquire a first destination MAC address corresponding to a first destination IP address that is in the response packet, where the first destination IP address is the same as the source IP address.

In this embodiment, after receiving the first packet sent by the gateway, the host generates the response packet according to the first packet. The first destination IP address is encapsulated in the response packet, where the first destination IP address is the same as the source IP address to ensure that the response packet is sent to the client that is in the external network and is accessing the host. The host queries the host cache table according to the first destination IP address that is in the response packet to acquire the first destination MAC address corresponding to the first destination IP address, and encapsulates the first destination MAC address in the response packet.

Step 204: According to the first destination MAC address corresponding to the first destination IP address that is in the response packet, forward the response packet to an external network by using the gateway.

In this embodiment, because the first destination MAC address is the real MAC address of the gateway, the response packet can be forwarded to the corresponding gateway according to the first destination MAC address, so that the gateway forwards the response packet to the client that is in the external network, thereby a completing packet exchange and implementing normal communication between the client in the external network and the host. In addition, it is ensured that bidirectional packets are forwarded by using a same gateway, so that a service, which can run only when paths of bidirectional packets are consistent, can work normally.

According to the packet forwarding method provided in this embodiment of the present disclosure, a first packet sent by a gateway is received, and the first packet is parsed to obtain a source IP address and a source MAC address from the first packet; a host cache table is queried, and when a mapping relationship between the source IP address and the source MAC address does not exist in the host cache table, the mapping relationship between the source IP address and the source MAC address is saved in the host cache table; a response packet is generated according to the first packet, and the host cache table is queried to acquire a first destination MAC address corresponding to a first destination IP address that is in the response packet, where the first destination IP address is the same as the source IP address; and according to the first destination MAC address corresponding to the first destination IP address that is in the response packet, the response packet is forwarded to an external network by using the gateway. Because the mapping relationship between the source IP address and the source MAC address is recorded in the host cache table, the first destination MAC address corresponding to the first destination IP address is obtained by querying the host cache table. Because the first destination MAC address is a real MAC address of the gateway, the response packet can be forwarded to the corresponding gateway according to the first destination MAC address, so that the gateway forwards the response packet to the external network by using the same gateway that forwards the first packet, thereby completing a packet exchange and implementing normal communication between a client in the external network and a host. In addition, it is ensured that, in a multi-active gateway scenario, bidirectional packets pass through a same path so that a service, which can run only when paths of bidirectional packets are consistent, can work normally.

According to the method embodiment described above, optionally, the method may further include: querying the host cache table, and if a second destination MAC address corresponding to a second destination IP address that is in a to-be-sent packet does not exist in the host cache table, querying an Address Resolution Protocol (ARP) table to acquire the second destination MAC address corresponding to the second destination IP address that is in the to-be-sent packet, and forwarding the to-be-sent packet to the external network by using a gateway corresponding to the second destination MAC address.

Specifically, the to-be-sent packet is a packet that the host first sends to the client that is in the external network by using the gateway. Persons skilled in the art may understand that ARP is a protocol for acquiring a physical address according to an IP address. Before sending the to-be-sent packet, the host first broadcasts an ARP request that includes the second destination IP address to all other hosts that are in a network, and receives an ARP response returned by another host to determine the second destination MAC address. It can be seen that, when the host accesses the client that is in the external network, because the second destination MAC address corresponding to the second destination IP address that is in the to-be-sent packet does not exist in the host cache table, the host may acquire the second destination MAC address by querying the ARP table, and send the to-be-sent packet to the corresponding gateway according to the second destination MAC address, so that the gateway forwards the to-be-sent packet to the client that is in the external network.

According to the packet forwarding method provided in this embodiment of the present disclosure, when a second destination MAC address corresponding to a second destination IP address that is in a to-be-sent packet does not exist in a host cache table, the second destination MAC address is acquired by querying an ARP table, and the to-be-sent packet is sent, by using a gateway, to an external network according to the second destination MAC address, so that in a situation in which a local host sends a packet first, the packet can also be normally forwarded.

According to the method embodiment described above, optionally, the method may further include: after the mapping relationship is saved in the host cache table, if the mapping relationship is not used or updated within a preset period of time, deleting, from the host cache table, an entry including the mapping relationship.

Specifically, persons skilled in the art may understand that in a packet forwarding process, even if a packet is sent and received between a same pair of IP addresses, packets including a same source IP address may be sent to different gateways due to a routing change that occurs when a router performs routing from equal-cost routes and that is caused by a change in a User Datagram Protocol (UDP) or Transmission Control Protocol (TCP) port number. In this case, after the host receives the packets, a phenomenon occurs that the source IP addresses of the packets are the same, but corresponding source MAC addresses are not the same. Therefore, each time when a packet is received, the host needs to query the host cache table. If a mapping relationship between the source IP address and the source MAC address corresponding to the source IP address does not exist in the host cache table, the mapping relationship between the source IP address and the source MAC address corresponding to the source IP address is saved to update the host cache table in real time and improve query accuracy.

After the mapping relationship is saved in the host cache table, if the mapping relationship, between the source IP address and the source MAC address corresponding to the source IP address, that is in the host cache table is not updated or a response packet is not matched to the mapping relationship within the preset period of time, the mapping relationship is deleted from the host cache table to save resources of the host. The preset period of time may be selected according to experience, for example, 1 hour (h) or 1.5 h. The present disclosure sets no special limitation on selection of a specific value of the preset period of time.

Figure 3:
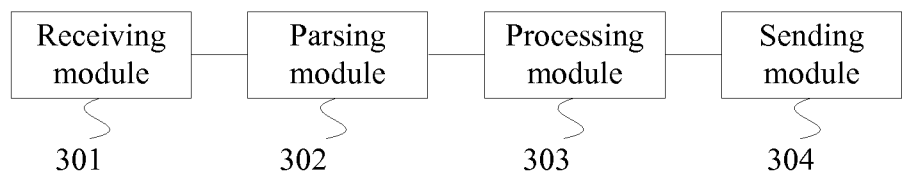
FIG. 3 is a schematic structural diagram of an embodiment of a packet forwarding apparatus according to the present disclosure.

FIG. 3 is a schematic structural diagram of an embodiment of a packet forwarding apparatus according to the present disclosure. As shown in FIG. 3, a packet forwarding apparatus provided in this embodiment of the present disclosure includes a receiving module 301, a parsing module 302, a processing module 303, and a sending module 304.

The receiving module 301 is configured to receive a first packet sent by a gateway. The parsing module 302 is configured to parse the first packet to obtain a source Internet Protocol (IP) address and a source Media Access Control (MAC) address from the first packet. The processing module 303 is configured to query a host cache table, and when a mapping relationship between the source IP address and the source MAC address does not exist in the host cache table, save the mapping relationship between the source IP address and the source MAC address in the host cache table. The processing module 303 is further configured to generate a response packet according to the first packet, and query the host cache table to acquire a first destination MAC address corresponding to a first destination IP address that is in the response packet, where the first destination IP address is the same as the source IP address. The sending module 304 is configured to forward, according to the first destination MAC address corresponding to the first destination IP address that is in the response packet, the response packet to an external network by using the gateway.

According to the packet forwarding apparatus provided in this embodiment of the present disclosure, a receiving module 301 receives a first packet sent by a gateway; a parsing module 302 parses the first packet to obtain a source IP address and a source MAC address from the first packet; a processing module 303 queries a host cache table, and when a mapping relationship between the source IP address and the source MAC address does not exist in the host cache table, saves the mapping relationship between the source IP address and the source MAC address in the host cache table; the processing module 303 generates a response packet according to the first packet, and queries the host cache table to acquire a first destination MAC address corresponding to a first destination IP address that is in the response packet, where the first destination IP address is the same as the source IP address; and a sending module 304 forwards, according to the first destination MAC address corresponding to the first destination IP address that is in the response packet, the response packet to an external network by using the gateway. Because the mapping relationship between the source IP address and the source MAC address is recorded in the host cache table, the first destination MAC address corresponding to the first destination IP address is obtained by querying the host cache table. The response packet can be forwarded to the corresponding gateway according to the first destination MAC address, so that the gateway forwards the response packet to the external network by using the same gateway that forwards the first packet, thereby completing packet exchange and implementing normal communication between a client in the external network and a host. In addition it is ensured that, in a multi-active gateway scenario, bidirectional packets pass through a same path so that a service, which can run only when paths of bidirectional packets are consistent, can work normally.

Optionally, the processing module 303 is further configured to query the host cache table, and if a second destination MAC address corresponding to a second destination IP address that is in a to-be-sent packet does not exist in the host cache table, query an Address Resolution Protocol (ARP) table to acquire the second destination MAC address corresponding to the second destination IP address that is in the to-be-sent packet.

The sending module 304 is further configured to forward the to-be-sent packet to the external network by using a gateway corresponding to the second destination MAC address.

Optionally, the processing module 303 is further configured to: after the mapping relationship is saved in the host cache table, if the mapping relationship is not used or updated within a preset period of time, delete, from the host cache table, an entry including the mapping relationship.

The packet forwarding apparatus in this embodiment may be used to implement technical solutions of the packet forwarding method provided in any one of the embodiments of the present disclosure. Implementation principles and technical effects of the apparatus are similar to those of the packet forwarding method and are not described herein again.

The present disclosure further provides a packet forwarding system, including a client, a gateway, a router, and a packet forwarding apparatus, where the packet forwarding apparatus may use the apparatus provided in the packet forwarding apparatus embodiment shown in FIG. 3. A specific structure and function are not described herein again.

The packet forwarding system in this embodiment may be used to implement technical solutions of the packet forwarding method provided in any one of the embodiments of the present disclosure. Implementation principles and technical effects of the system are similar to those of the packet forwarding method and are not described herein again.

Figure 4:
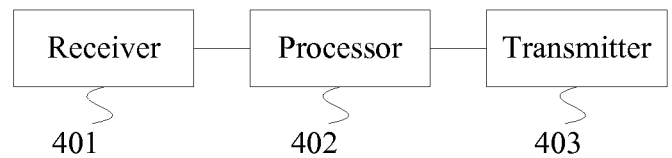
FIG. 4 is a schematic structural diagram of an embodiment of a host according to the present disclosure.

FIG. 4 is a schematic structural diagram of an embodiment of a host according to the present disclosure. As shown in FIG. 4, the host provided in this embodiment of the present disclosure includes a receiver 401, a processor 402, and a transmitter 403.

The receiver 401 is configured to receive a first packet sent by a gateway. The processor 402 is configured to parse the first packet to obtain a source Internet Protocol (IP) address and a source Media Access Control (MAC) address from the first packet. The processor 402 is further configured to query a host cache table, and when a mapping relationship between the source IP address and the source MAC address does not exist in the host cache table, save the mapping relationship between the source IP address and the source MAC address in the host cache table. The processor 402 is further configured to generate a response packet according to the first packet, and query the host cache table to acquire a first destination MAC address corresponding to a first destination IP address that is in the response packet, where the first destination IP address is the same as the source IP address. The transmitter 403 is configured to forward, according to the first destination MAC address corresponding to the first destination IP address that is in the response packet, the response packet to an external network by using the gateway.

The host in this embodiment may be used to implement technical solutions of the packet forwarding method provided in any one of the embodiments of the present disclosure. Implementation principles and technical effects of the host are similar to those of the packet forwarding method and are not described herein again.

Optionally, the processor 402 is further configured to query the host cache table, and if a second destination MAC address corresponding to a second destination IP address that is in a to-be-sent packet does not exist in the host cache table, query an Address Resolution Protocol (ARP) table to acquire the second destination MAC address corresponding to the second destination IP address that is in the to-be-sent packet; the transmitter 403 is further configured to forward the to-be-sent packet to the external network by using a gateway corresponding to the second destination MAC address.

Optionally, the processor 402 is further configured to: after the mapping relationship is saved in the host cache table, if the mapping relationship is not used or updated within a preset period of time, delete, from the host cache table, an entry including the mapping relationship.

The host in this embodiment may be used to implement technical solutions of the packet forwarding method provided in any one of the embodiments of the present disclosure. Implementation principles and technical effects of the host are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random access memory (RAM), a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A packet forwarding method performed by a host, comprising:
receiving a first packet from a client in an external network via a gateway;
parsing the first packet to obtain a source Internet Protocol (IP) address and a source Media Access Control (MAC) address from the first packet, wherein the source IP address of the first packet is an IP address of the client in the external network, wherein the source MAC address is a real MAC address of the gateway, wherein the gateway is one of multiple gateways that simultaneously provide a gateway service for the host and other devices in a same network segment, and wherein the multiple gateways form a multi-active gateway;
querying a host cache table that is different than an Address Resolution Protocol (ARP) table to determine whether a mapping relationship between the source IP address and the source MAC address exists in the host cache table;
saving a mapping relationship between the source IP address and the source MAC address in the host cache table when the mapping relationship between the source IP address and the source MAC address does not exist in the host cache table;
generating a response packet according to the first packet;
querying the host cache table to acquire a first destination MAC address corresponding to a first destination IP address that is in the response packet, wherein the first destination IP address is the same as the source IP address, and wherein the first destination MAC address is the real MAC address of the gateway; and
sending the response packet to the client in the external network using the gateway, wherein the response packet comprises the first destination MAC address and the first destination IP address; and
querying the ARP table to acquire a second destination MAC address corresponding to a second destination IP address that is in a to-be-sent packet when the second destination MAC address corresponding to the second destination IP address that is in the to-be-sent packet does not exist in the host cache table, wherein the to-be-sent packet is a packet that the host first sends to another client that is in the external network.

2. The method according to claim 1, further comprising:
querying the host cache table when the host needs to send a to-be-sent packet; and
sending the to-be-sent packet to the external network using the gateway corresponding to the second destination MAC address,
wherein the second destination IP address is an IP address of the other client, and
wherein the gateway corresponding to the second destination MAC address is the multi-active gateway.

3. The method according to claim 1, further comprising deleting, from the host cache table, an entry comprising the mapping relationship after the mapping relationship is saved in the host cache table and when the mapping relationship is not used and not updated within a preset period of time.

4. The method according to claim 2, further comprising deleting, from the host cache table, an entry comprising the mapping relationship after the mapping relationship is saved in the host cache table and when the mapping relationship is not used and not updated within a preset period of time.

5. The method according to claim 1, further comprising deleting, from the host cache table, an entry comprising the mapping relationship after the mapping relationship is saved in the host cache table and when the mapping relationship is not used and not updated within a preset period of time.

6. The method according to claim 2, further comprising deleting, from the host cache table, an entry comprising the mapping relationship after the mapping relationship is saved in the host cache table and when the mapping relationship is not used and not updated within a preset period of time.

7. A host, comprising:
a receiver configured to receive a first packet from a client in an external network via a gateway;
a processor coupled to the receiver and configured to:
parse the first packet to obtain a source Internet Protocol (IP) address and a source Media Access Control (MAC) address from the first packet, wherein the source IP address of the first packet is an IP address of the client in the external network, wherein the source MAC address is a real MAC address of the gateway, wherein the gateway is one of multiple gateways that simultaneously provide a gateway service for the host and other devices in a same network segment, and wherein the multiple gateways form a multi-active gateway;
query a host cache table that is different than an Address Resolution Protocol (ARP) table to determine whether a mapping relationship between the source IP address and the source MAC address exists in the host cache table;
save a mapping relationship between the source IP address and the source MAC address in the host cache table when the mapping relationship between the source IP address and the source MAC address does not exist in the host cache table; and
generate a response packet according to the first packet; and
query the host cache table to acquire a first destination MAC address corresponding to a first destination IP address that is in the response packet, wherein the first destination IP address is the same as the source IP address, and wherein the first destination MAC address is the real MAC address of the gateway; and
query the ARP table to acquire a second destination MAC address corresponding to a second destination IP address that is in a to-be-sent packet when the second destination MAC address corresponding to the second destination IP address that is in the to-be-sent packet does not exist in the host cache table, wherein the to-be-sent packet is a packet that the host first sends to another client that is in the external network; and
a transmitter configured to send the response packet to the client in the external network using the gateway, wherein the response packet comprises the first destination MAC address and the first destination IP address.

8. The host according to claim 7, wherein the processor is further configured to:
query the host cache table when the apparatus needs to send a to-be-sent packet; and
send the to-be-sent packet to the external network using the gateway corresponding to the second destination MAC address,
wherein the second destination IP address is an IP address of the other client, and
wherein the gateway corresponding to the second destination MAC address is the multi-active gateway.

9. The host according to claim 7, wherein the processor is further configured to delete, from the host cache table, an entry comprising the mapping relationship after the mapping relationship is saved in the host cache table and when the mapping relationship is not used and not updated within a preset period of time.

10. The host according to claim 8, wherein the processor is further configured to delete, from the host cache table, an entry comprising the mapping relationship after the mapping relationship is saved in the host cache table and when the mapping relationship is not used and not updated within a preset period of time.

11. A system comprising:
a client router;
a first gateway in communication with the client router;
a second gateway in communication with the client router;
a plurality of devices in communication with the first gateway and the second gateway,
wherein the first gateway and the second gateway are positioned between the client router and the devices,
wherein the first gateway and the second gateway simultaneously provide gateway services to the devices and form a multi-active gateway,
wherein the client router is in a first network domain,
wherein the devices are in a second network domain,
wherein one of the devices is a host,
wherein the client router is configured to send a first packet to the host via the first gateway, and
wherein the host is configured to:
parse the first packet to obtain a source Internet Protocol (IP) address and a source Media Access Control (MAC) address from the first packet, wherein the source IP address of the first packet is an IP address of the client router, wherein the source MAC address is a real MAC address of the first gateway;
query a host cache table that is different than an Address Resolution Protocol (ARP) table to determine whether a mapping relationship between the source IP address and the source MAC address exists in the host cache table;
save a mapping relationship between the source IP address and the source MAC address in the host cache table when the mapping relationship between the source IP address and the source MAC address does not exist in the host cache table;
generate a response packet according to the first packet;
query the host cache table to acquire a first destination MAC address corresponding to a first destination IP address that is in the response packet, wherein the first destination IP address is the same as the source IP address, and wherein the first destination MAC address is the real MAC address of the first gateway; and
send the response packet to the client router using the first gateway, wherein the response packet comprises the first destination MAC address and the first destination IP address; and
query the ARP table to acquire a second destination MAC address corresponding to a second destination IP address that is in a to-be-sent packet when the second destination MAC address corresponding to the second destination IP address that is in the to-be-sent packet does not exist in the host cache table, wherein the to-be-sent packet is a packet that the host first sends to another client that is in an external network.

12. The system according to claim 11, wherein the host is further configured to:
query the host cache table when the host needs to send a to-be-sent packet; and
send the to-be-sent packet to a second client router in the first network domain using the second destination MAC address, and
wherein the second destination IP address is an IP address of the other client.

* * * * *